United States Patent Office 3,079,418
Patented Feb. 26, 1963

3,079,418
THERMAL STABILIZATION OF HALOALKYL PHOSPHORIC ACID ESTERS
Charles Theodore Pumpelly, Midland, Mich., assignor to The Dow Chemical Company, Midland, Mich., a corporation of Delaware
No Drawing. Filed Jan. 25, 1960, Ser. No. 4,179
5 Claims. (Cl. 260—461)

The present invention relates to the thermal stabilization of haloalkyl phosphoric acid esters and is more particularly concerned with the stabilization of haloalkyl phosphoric acid esters with glycidyl polyethers of polyhydric phenols and with the stabilized compositions produced by the method of this invention.

Haloalkyl phosphoric acid esters are very effective flame proofing agents for solid plastic materials. However, in the process of extrusion or molding of the thermoplastic materials the phosphoric acid esters tend to decompose under the influence of the temperatures employed, resulting in the formation of free acids which cause corrosion of the equipment and undesirable properties of the polymer.

I have found that minor amounts of glycidyl polyethers of polyhydric phenols may be incorporated in haloalkyl phosphoric acid esters without effecting the fire retardant activity of said esters, and that when such stabilized esters are subjected to temperatures which are normally employed in molding and extruding thermoplastic materials essentially no decomposition occurs.

The glycidyl polyethers of polyhydric phenols which are useful in the practice of this invention are epoxidized bisphenols having an epoxy equivalent weight of from about 170 to about 600 and epoxidized phenol-formaldehyde resins having a molecular weight of from about 300 to about 800, preferably from about 400 to 650. Examples of such resins are the diglycidyl ether of Bisphenol A, the products obtained by reacting this ether with further Bisphenol A moieties in a ratio greater than 1 part ether to 1 part phenol, epoxidized novolak resins containing from 2 to about 6 benzyloxy units per molecule, mixtures thereof and the like. These stabilizers are incorporated in the haloalkyl phosphoric acid esters in an amount of from 0.1 to 10 percent preferably from about 2 to about 8 percent and, desirably about 5 percent, by weight to stabilize the esters against the deleterious effects of heat.

Haloalkyl phosphoric acid esters which may be stabilized with the method of this invention include tris(2,3-dibromopropyl)phosphate, tris(1,3-dibromopropyl)phosphate, tris(2,3-dichloropropyl)phosphate, tris(2-bromoethyl)phosphate, tris(3-bromopropyl)phosphate, the corresponding mixed esters, mixtures of the foregoing, and the like.

The present invention may be better understood but is not to be construed as limited by the following example:

*Example I*

Samples of tris(2,3-dibromopropyl)phosphate were separately treated with 5 weight percent of the diglycidyl ether of Bisphenol A and an epoxidized novolak resin containing from 2 to about 6 benzyloxy units per molecule and an average of about 3.2 epoxy groups per molecule. Each sample was mixed at 60° C. and then heated to 200° C. and maintained at that temperature for 10 minutes. After cooling to room temperature the acid number was determined (ASTM D664–52). The acid number of the material before heating was 2.2. The acid number of the diglycidyl ether of Bisphenol A treated sample was 1.2, and that of the epoxidized novolak treated sample 0.8. In contrast, the acid number of a sample similarly treated with ethylene oxide was 14.0.

In a manner similar to that of Example I, tris(1,3-dibromopropyl)phosphate was stabilized with the epoxy resins of this invention.

Various modifications may be made in the present invention without departing from the spirit or scope thereof, and it is understood that I limit myself only as defined in the appended claims.

I claim:
1. A method of inhibiting the thermal decomposition of tris chloro- and bromo-lower alkyl phosphoric acid esters comprising adding from 0.1 to 10.0 weight percent of a glycidyl polyether of a polyhydric phenol to said esters.
2. The method of claim 1 wherein the ester is tris(2,3-dibromopropyl)phosphate.
3. The method of claim 2 wherein the polyether is the diglycidyl ether of 4,4'-isopropylidenediphenol.
4. The method of claim 2 wherein the polyether is an epoxidized phenol-formaldehyde resin containing from 2 to about 6 benzyloxy units per molecule and an average of about 3.2 epoxy groups per molecule.
5. A composition consisting essentially of a member of the group consisting of tris chloro- and bromo-lower alkyl phosphoric acid ester and from 0.1 to 10 weight percent of a glycidyl polyether of a polyhydric phenol.

References Cited in the file of this patent
UNITED STATES PATENTS

| | | |
|---|---|---|
| 2,564,194 | De Nie et al. | Aug. 14, 1951 |
| 2,842,497 | Watson | July 8, 1958 |